United States Patent
Zeira et al.

(10) Patent No.: US 7,408,902 B2
(45) Date of Patent: Aug. 5, 2008

(54) METHOD OF USING A RADIO NETWORK CONTROLLER FOR CONTROLLING DATA BIT RATES TO MAINTAIN THE QUALITY OF RADIO LINKS

(75) Inventors: Eldad Zeira, Huntington, NY (US); Guodong Zhang, Farmingdale, NY (US); Stephen E. Terry, Northport, NY (US); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 803 days.

(21) Appl. No.: 10/775,629

(22) Filed: Feb. 10, 2004

(65) Prior Publication Data

US 2005/0030895 A1 Feb. 10, 2005

Related U.S. Application Data

(60) Provisional application No. 60/448,233, filed on Feb. 13, 2003.

(51) Int. Cl.
*H04L 12/28* (2006.01)
*H04J 3/16* (2006.01)
*H04B 7/216* (2006.01)
*H04B 17/02* (2006.01)
*H04Q 7/20* (2006.01)
*H04Q 7/00* (2006.01)
*G01R 31/08* (2006.01)

(52) U.S. Cl. ............... 370/333; 370/395.21; 370/335; 370/468; 370/452; 455/452.1; 455/135

(58) Field of Classification Search ............... 370/318, 370/329, 330, 341, 468, 395.4, 333, 395.21, 370/332, 252, 253, 335, 432; 455/436, 452.2, 455/13.4, 522, 135, 452.1, 403, 423, 456.2, 455/134

See application file for complete search history.

(56) References Cited

U.S. PATENT DOCUMENTS 5,513,213 A 4/1996 Patel et al.

(Continued)

FOREIGN PATENT DOCUMENTS

EP 1 069 721 1/2001

(Continued)

OTHER PUBLICATIONS

Tonjes et al., "Flow-Control for Multi-Access Systems", The 13th IEEE International Symposium on Personal Indoor and Mobile Radio Communications, vol. 2, Sep. 2002, pp. 535-539.
Elmallah et al., "A Power-Aware Admission Control Scheme for Supporting the Assured Forwarding Model in CDMA Cellular Networks", 27th Annual IEEE Conference on Local Computer Networks, IEEE, Nov. 2002, pp. 211-219.

(Continued)

*Primary Examiner*—Hanh Nguyen
(74) *Attorney, Agent, or Firm*—Volpe and Koenig, P.C.

(57) ABSTRACT

A wireless communication method and system for controlling the current data bit rate of a radio link (RL) to maintain the quality of the RL. The system includes a core network (CN), a radio network controller (RNC) and at least one wireless transmit/receive unit (WTRU). The RL is established between the RNC and the WTRU. The RNC establishes a guaranteed data bit rate, a maximum data bit rate and a current data bit rate associated with the RL. When the RNC senses an event which indicates that the quality of the RL has substantially deteriorated, the RNC reduces the value of the current data bit rate. Then, in a recovery process, if a similar event does not occur during an established waiting period, the RNC restores the current data bit rate back to the maximum data bit rate.

11 Claims, 4 Drawing Sheets

U.S. PATENT DOCUMENTS

Figure 1:
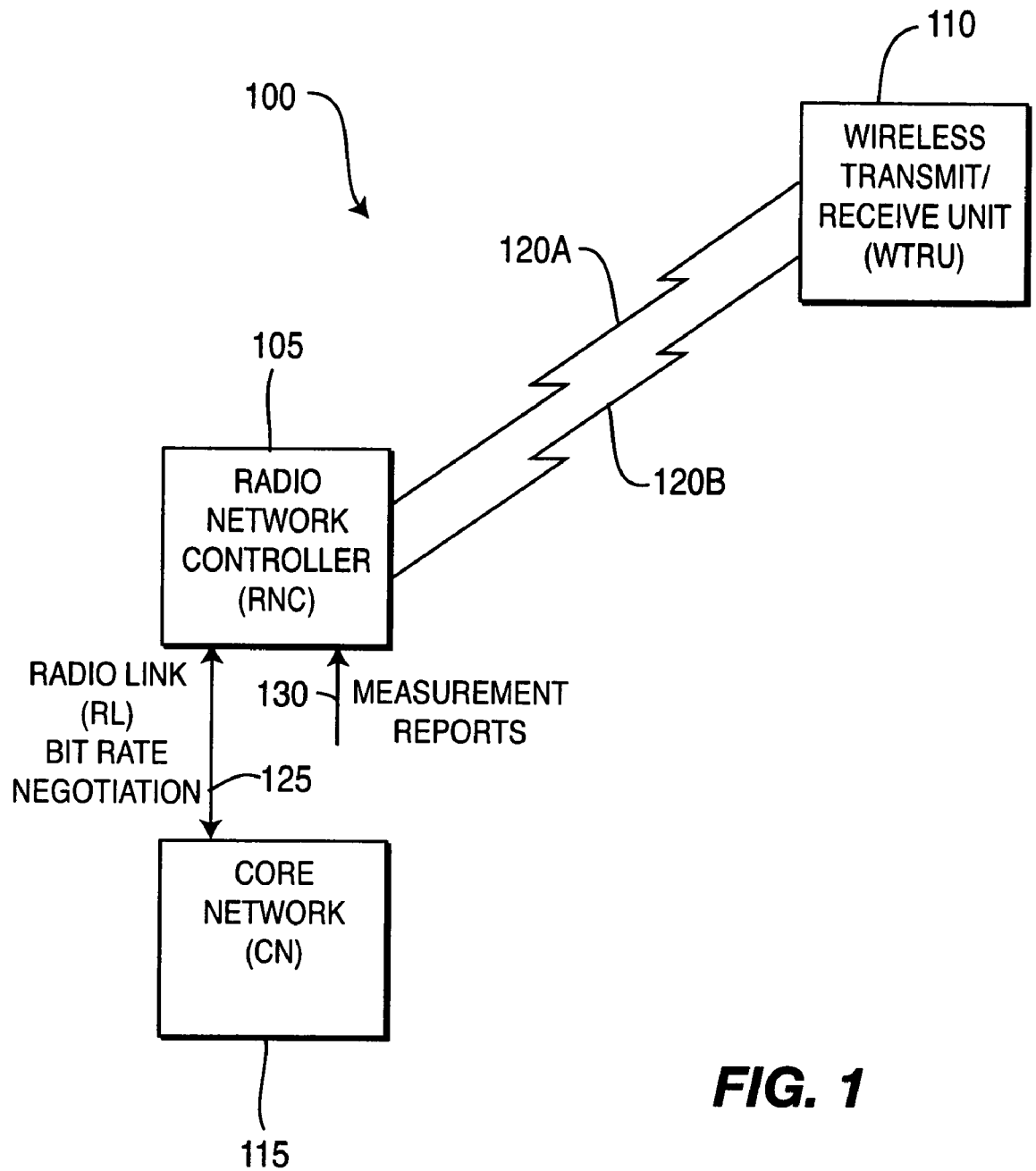

| | | | |
|---|---|---|---|
| 6,317,224 | B1 | 11/2001 | Lutgen et al. |
| 6,597,894 | B1 * | 7/2003 | Ue et al. ............... 455/69 |
| 6,845,088 | B2 * | 1/2005 | Terry et al. ............. 370/335 |
| 6,944,473 | B2 * | 9/2005 | Irwin et al. ............. 455/550.1 |
| 7,106,694 | B1 * | 9/2006 | Salonen et al. ............. 370/230 |
| 2002/0115443 | A1 | 8/2002 | Friberg et al. |
| 2004/0047328 | A1 | 3/2004 | Proctor, Jr. |
| 2004/0106425 | A1 | 6/2004 | Koo et al. |
| 2004/0132441 | A1 | 7/2004 | Livet et al. |

FOREIGN PATENT DOCUMENTS

| | | |
|---|---|---|
| WO | 01/78328 | 10/2001 |
| WO | 02/065675 | 8/2002 |
| WO | 2004/045239 | 5/2004 |

OTHER PUBLICATIONS

Sanjiv et al. "Adaptation Techniques in Wireless Packet Data Services." IEEE Communications Magazine, vol. 38, No. 1, Jan. 2000, pp. 54-64.

Universal Mobile Telecommunications System (UTMS); Radio Resource Management Strategies (3GPP TR 25.922 V 5.0.0 Release 5); ETSI TR 125 922. ETSI Standards, European Telecommunications Standards Institute, Mar. 2002, XP 014005111, p. 41.

Prabhu et al. "Performance of Code Allocation Algorithms on UTMS Uplink With Mixed Voice/Data Traffic." Personal Wireless Communications, 2002 IEEE International Conference, Dec. 15, 2002, XP 010630745, pp. 25-29.

Baey et al. "QOS Tuning and Resource Sharing for UTMS WCDMA Multiservice Mobile." IEEE Transactions on Mobile Computing, vol. 1, No. 3, Jul. 2002, pp. 221-235.

Prabhu et al. "Performance of Code Allocation Algorithms on UTMS Uplink With Mixed Voice/Data Traffic." Personal Wireless Communications, 2002 IEEE International Conference, Dec. 15, 2002, XP 010630745, pp. 25-29.

Baey et al. "QOS Tuning and Resource Sharing for UTMS WCDMA Multiservice Mobile." IEEE Transactions on Mobile Computing, vol. 1, No. 3, Jul. 2002, pp. 221-235.

\* cited by examiner

200

METHOD OF USING A RADIO NETWORK CONTROLLER FOR CONTROLLING DATA BIT RATES TO MAINTAIN THE QUALITY OF RADIO LINKS

CROSS REFERENCE TO RELATED APPLICATION

This application claims priority from U.S. Provisional patent application Ser. No. 60/448,233, filed Feb. 13, 2003, which is incorporated by reference as if fully set forth herein.

FIELD OF THE INVENTION

The present invention generally relates to the management of radio resources in a wireless communication system. More particularly, the present invention relates to maintaining the quality of a wireless communication radio link (RL).

BACKGROUND

Generally, the RL related aspects of a conventional wireless multi-cell communication system are handled by a radio network controller (RNC). Furthermore, the RNC is also responsible for the management of radio resources for the purpose of maintaining RL quality on a per RL basis, otherwise known as link maintenance.

The application of link maintenance applies to both circuit switched and packet switched services. In the above-mentioned conventional system, the deterioration of radio links occurs due to unpredictable circumstances. The RL quality of service sometimes falls below an established threshold level, or stays below a threshold level for longer than a predetermined time period.

It is desirable to provide a method and system for adjusting the data bit rate of the RL in order to enable efficient link maintenance and avoiding RL quality of service deterioration.

SUMMARY

The present invention is a wireless communication method and system for controlling the data bit rate of an RL to maintain the quality of the RL. The system includes a core network (CN), a radio network controller (RNC) and at least one wireless transmit/receive unit (WTRU). The RL is established between the RNC and WTRU.

The RNC establishes a guaranteed data bit rate, a maximum data bit rate and a current data bit rate associated with the RL. The RNC senses an event which indicates that the quality of the RL has substantially deteriorated or indicates an inability to maintain the quality of the RL, and determines a target data bit rate based on the sensed event. The RNC renegotiates a new guaranteed data bit rate with the CN if the target data bit rate is less than the guaranteed data bit rate. The RNC reduces the current data bit rate to a target data bit rate by reconfiguration of the Transport Format Combination Set (TFCS). This process repeats until events indicating that the RL quality has deteriorated cease to occur.

The sensed event may be the receipt in the RNC of at least one measurement indicating that the transmission power is at (or near) a maximum level, or that a block error rate (BLER) associated with the WTRU RL has exceeded a predetermined threshold for a predetermined period of time. The fact that the maximum transmission power has been reached is either identified by the WTRU for uplink transmissions, or by a Node B for downlink transmissions. The BLER measurement is reported by the WTRU for downlink transmissions and by Node B for uplink transmissions.

The RNC may determine the identity of a specific coded composite transport channel (CCTrCH) associated with the RL. The data bit rate is adjusted by removing one or more Transport Format Combinations (TFCs) from the TFCS associated with the CCTrCH. The process of managing the data bit rate of each RL operates independently for uplink and downlink channels.

In another embodiment, the present invention is a method and system for increasing the data bit rate following the implementation of a corrective action to maintain the quality of the RL by reducing the current data bit rate from a maximum data bit rate to a reduced data bit rate, or following RL establishment at a data bit rate lower than the maximum data bit rate. The RNC either senses an event that indicates the RL quality has increased beyond a predetermined threshold, or determines that an event which indicates that the quality of the RL has substantially deteriorated beyond a predetermined threshold does not occur during a predetermined time period. The RNC then determines the identity of a specific CCTrCH, associated with the RL, to be reconfigured. The RNC increases the current data bit rate by reconfiguration of the CCTrCH by adding one or more TFCs to a TFCS associated with the CCTrCH. If the current data bit rate is not equal to the maximum data bit rate, this process repeats.

BRIEF DESCRIPTION OF THE DRAWING(S)

Figure 2A:
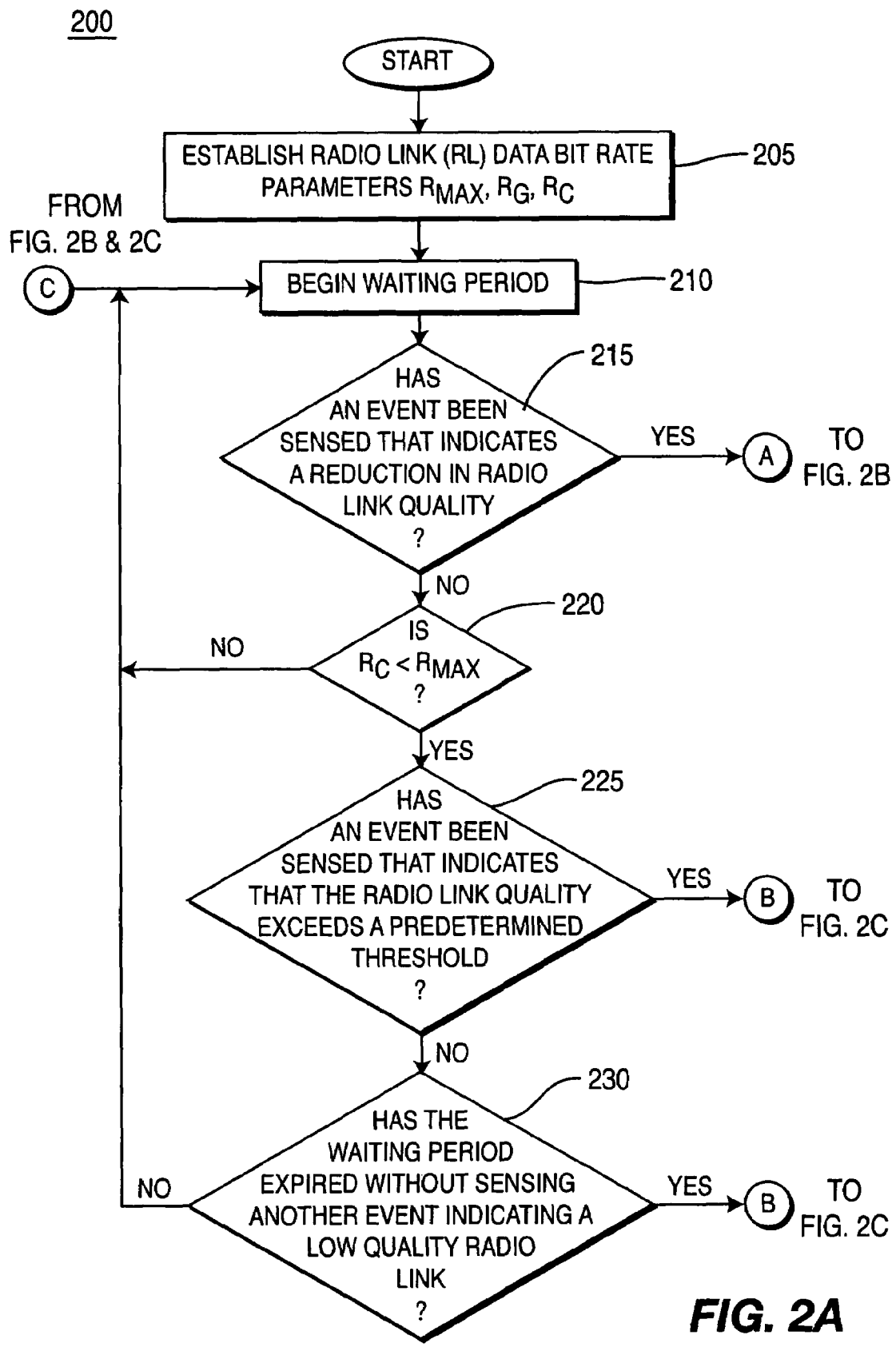
Figure 2B:
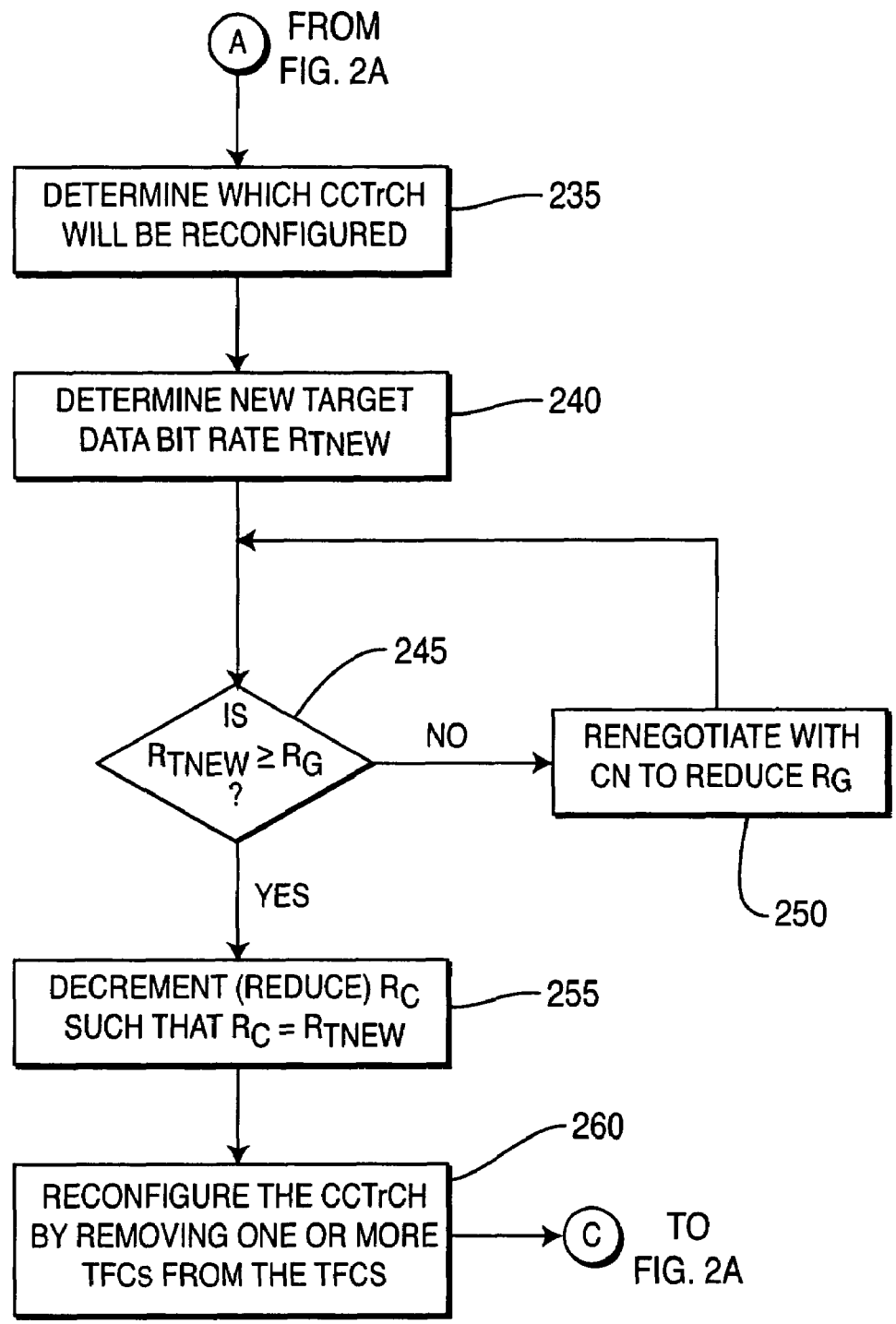
Figure 2C:
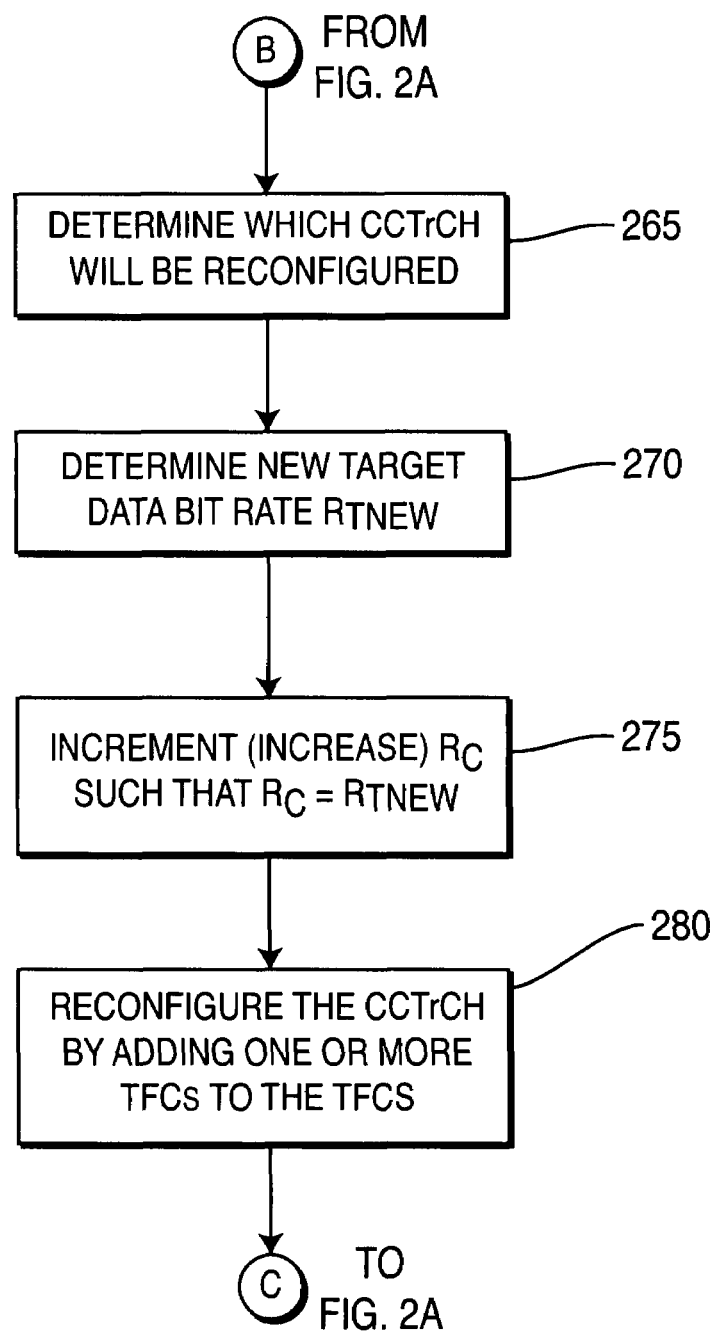

A more detailed understanding of the invention may be had from the following description of a preferred example, given by way of example and to be understood in conjunction with the accompanying drawing wherein:

FIG. 1 is a block diagram of a wireless communication system operating in accordance with the present invention; and FIGS. 2A, 2B and 2C, taken together, are a flowchart of a link maintenance process used for RL data bit rate reduction and recovery.

DETAILED DESCRIPTION OF THE PREFERRED EMBODIMENTS

The present invention is a wireless communication method and system for enabling link maintenance to maintain the quality of RLs.

Hereafter, a wireless transmit/receive unit (WTRU) includes but is not limited to a user equipment, mobile station, fixed or mobile subscriber unit, pager, or any other type of device capable of operating in a wireless environment.

The present invention is applicable to communication systems such as a universal mobile telecommunication system (UMTS), whereby time division duplex (TDD), time division multiple access (TDMA), frequency division duplex (FDD), code division multiple access (CDMA), CDMA 2000, time division synchronous CDMA (TDSCDMA), and orthogonal frequency division multiplexing (OFDM) may be implemented. However, the present invention is envisaged to be applicable to other types of communication systems as well.

In third generation (3G) wireless communication systems, possible data bit rates and data multiplexing are defined by the available TFCS. Each TFC corresponds to particular data bit rates. By adding and removing at least one TFC from the TFCS, the maximum possible data bit rate may be increased or decreased.

FIG. 1 is an exemplary block diagram of a wireless communication system 100 operating in accordance with the present invention. System 100 includes an RNC 105, a WTRU 110 and a core network (CN) 115. The RNC 105 establishes one or more RLs 120A, 120B, with the WTRU 110 to provide uplink and downlink communications. The RNC 105 maintains the RLs 120A, 120B, based on the negotiated data bit rates and the desired quality ranges. The RNC 105 and the CN 115 negotiate via path 125 to establish a maximum and a guaranteed, (i.e., minimum), data bit rate for the RLs 120A, 120B, such that the quality of the RLs 120A, 120B, remain within a desired quality range having an upper threshold and a lower threshold.

In one embodiment, changes to the data bit rates may be responsive to measurement reports received via path 130. The measurement reports may include base station (Node B) and WTRU transmission power measurements, and BLER measurements. The RNC 105 may monitor the measurement reports to determine when it needs to adjust the current data bit rate to maintain the quality and maximum data bit rates of the RLs 120A, 120B.

In the event that the link quality falls below an established threshold, if the reported link quality remains below the threshold for a predetermined amount of time, or the system 100 is unable to maintain an acceptable link quality, the RNC 105 reduces the data bit rate of the RL 120. Each RL determination of quality and data bit rate adjustments is managed independently for the uplink and downlink.

The data bit rate of the RL 120 may be incrementally reduced to a fraction of the maximum data bit rate. This is accomplished by removing TFCs from the available TFCS of that CCTrCH. The RNC 105 may reduce the data bit rate of the RL 120 as low as the guaranteed data bit rate without renegotiating with the CN 115.

If the data bit rate of the RL 120 is already at the guaranteed data bit rate due to a link quality problem, the RNC 105 may attempt to renegotiate the guaranteed data bit rate of the RL 120 via path 125 such that the data bit rate of the RLs 120A, 120B, may be further reduced.

After the RL data bit rate is reduced or if the RL 120A, 120B, is established at a data bit rate below the maximum data bit rate, then if either the RNC 105 senses an event that indicates the quality of RL 120 has increased beyond a predetermined threshold or a lower quality of service event is not present for a certain period of time, the data bit rate of the RL 120 is incrementally increased. This is accomplished by adding TFCs to the available TFCS of that CCTrCH.

FIGS. 2A, 2B and 2C, taken together, are a flowchart of an RL link maintenance process 200 for data bit rate adjustment in accordance with one embodiment of the present invention. During a system steady state, initial RL data bit rate parameters $R_{MAX}$, $R_G$ and $R_C$ are established (step 205), whereby $R_{MAX}$ is the maximum data bit rate permitted for RLs 120, $R_G$ is the guaranteed data bit rate permitted for RLs 120, and $R_C$ is the current data bit rate at which the RLs 120 are presently operating. The RNC 105 monitors measurement reports received via path 130 from the WTRU and Node B which indicate the quality level and the ability to maintain the quality level of the RLs 120A, 120B. In step 210, a waiting period, (i.e., a predetermined period of time) is initiated. Based on the BLER and transmission power measurement reports 130, the process 200 is capable of sensing when the quality of the RL 120A, 120B, has substantially deteriorated (step 215) and, if so, the data bit rate is reduced by implementing steps 235-260. In step 220, a determination is made as to whether the current data bit rate $R_C$ is less than the maximum data bit rate $R_{MAX}$. If $R_C$ is less than $R_{MAX}$, the process 200 proceeds to step 225 where it is determined whether an event has been sensed that indicates that the quality of the RL 120A, 120B, exceeds a predetermined threshold and, if so, the data bit rate is increased by implementing steps 265-280. If the predetermined threshold is not exceeded but, in step 230, the waiting period expires without sensing another event indicating event indicating a deteriorated quality RL 120A, 120B, the data bit rate is increased by implementing steps 265-280.

It should be understood that the process 200 for link maintenance is independently implemented to support uplink and the downlink operations. For the uplink operation, the RNC in step 210 either senses a maximum WTRU transmission power event or high BLER measurement from Node B. For the downlink operation, the RNC in step 210 either senses a high BLER report from the WTRU or maximum (or close to maximum) transmission power from Node B.

The process of reducing the data bit rate is implemented as follows. In step 235, the specific CCTrCH that will need to be reconfigured is determined. In step 240, a new target data bit rate $R_{TNEW}$ is determined to correct the sensed RL quality deficiency. If the new target data bit rate $R_{TNEW}$ is determined to be greater than or equal to the guaranteed data bit rate $R_G$ (step 245), no renegotiation with the CN 115 is necessary and the current data bit rate $R_C$ is decremented (reduced) until $R_C=R_{TNEW}$ (step 255), otherwise the RNC 105 renegotiates with the CN 115 via path 125 (step 250). In step 260, the specific CCTrCH determined in step 235 is reconfigured by removing one or more TFCs from the TFCS associated with the CCTrCH. The process then returns to step 210 where the waiting period begins again.

The process of increasing the data bit rate is implemented as follows. In step 265, the specific CCTrCH that will need to be reconfigured is determined. In step 270, a new target data bit rate $R_{TNEW}$ is determined that is expected to operate within the predetermined RL quality thresholds. In step 275, the current data bit rate $R_C$ is incremented (increased) until $R_C=R_{TNEW}$. In step 280, the specific CCTrCH determined in step 265 is reconfigured by adding one or more TFCs to the TFCS associated with the CCTrCH. The process then returns to step 210 where the waiting period begins again.

In one embodiment, the number of data bit rate reduction adjustments is limited to a predetermined number. If the number of data bit rate adjustments is exceeded, a handover of the associated RL is implemented.

In another embodiment, if a request to renegotiate the guaranteed data bit rate $R_G$ with the CN 115 is unsuccessful, (e.g., a waiting period expires before the CN 115 provides a response to a data bit rate change request), a handover of the associated RL is implemented.

In an alternate embodiment, rather than waiting period expiring without any detrimental event being sensed, as in step 230 of process 200, the RNC 105 will instead wait for updated measurements to confirm if the link quality is back to normal.

If, during the waiting period, the RNC 105 receives a report that the quality of the same RL 120 is too good, (implying the need for data bit rate recovery), the RNC 105 will immediately incrementally increase (recover) the data bit rate of the RL 120. This increase in the data bit rate will not exceed the maximum data bit rate $R_{MAX}$ that was negotiated with the CN 115.

When the data bit rate is either reduced or increased, both transport channel reconfiguration and physical channel reconfiguration may be implemented for the respective RL. The transport configuration removes and adds TFCs to the TFCS. A physical reconfiguration is used- to reduce or increase corresponding physical resources.

While this invention has been particularly shown and described with reference to preferred embodiments, it will be understood by those skilled in the art that various changes in form and details may be made therein without departing from the scope of the invention described hereinabove.

What is claimed is:

1. A method of using a radio network controller (RNC) for controlling the data bit rate of a radio link (RL) to maintain the quality of the RL, the method comprising:
    establishing a guaranteed data bit rate, a maximum data bit rate and a current data bit rate associated with the RL;
    sensing an event indicating a quality deficiency of the RL;
    determining the identity of a specific coded composite transport channel (CCTrCH) associated with the RL;
    determining a target data bit rate needed to correct the RL quality deficiency;
    if the target data bit rate is less than the guaranteed data bit rate, renegotiating a new guaranteed data bit rate with a core network (CN); and
    if the target data bit rate is greater than or equal to the guaranteed data bit rate, reducing the current data bit rate to the target data bit rate by removing at least one transport format combination (TFC) from a transport format combination set (TFCS) associated with the specific CCTrCH.

2. The method of claim 1 further comprising:
    initiating a waiting period; and
    the new guaranteed data bit rate is not renegotiated before the waiting period expires, initiating a handover procedure for the RL.

3. The method of claim 1 wherein the event is the receipt of at least one measurement indicating that the transmission power of a wireless transmit/receive unit (WTRU) is at a maximum level.

4. The method of claim 1 wherein the event is the receipt of at least one measurement indicating a block error rate (BLER) associated with a wireless transmit/receive unit (WTRU) is too high for a predetermined period of time.

5. The method of claim 1 wherein the RL is an uplink.

6. The method of claim 1 wherein the RL is a downlink.

7. A method of using a radio network controller (RNC) for controlling the current data bit rate of a radio link (RL) to recover from implementing a corrective action to maintain the quality of the RL by reducing the current data bit rate from a maximum data bit rate to a reduced data bit rate, the method comprising:
    determining that an event which indicates that the quality of the RL has substantially deteriorated does not occur during a predetermined time period;
    determining the identity of a specific coded composite transport channel (CCTrCH), associated with the RL, to be reconfigured;
    if the current data bit rate is not equal to the maximum data bit rate, increasing the current data bit rate to a target data bit rate by adding at least one transport format combinations (TFC) to a transport format combination set (TFCS) associated with the specific CCTrCH; and
    if the target data bit rate is greater than the maximum data bit rate, renegotiating a new maximum data bit rate with a core network (CN).

8. The method of claim 7 wherein the event is the receipt of at least one measurement indicating the transmission power of a wireless transmit/receive unit (WTRU) is at a maximum level.

9. The method of claim 7 wherein the event is the receipt of at least one measurement indicating a block error rate (BLER) associated with a wireless transmit/receive unit (WTRU) is too high for a predetermined period of time.

10. The method of claim 7 wherein the RL is an uplink.

11. The method of claim 7 wherein the RL is a downlink.

* * * * *

UNITED STATES PATENT AND TRADEMARK OFFICE
CERTIFICATE OF CORRECTION

PATENT NO. : 7,408,902 B2
APPLICATION NO. : 10/775629
DATED : August 5, 2008
INVENTOR(S) : Zeira et al.

It is certified that error appears in the above-identified patent and that said Letters Patent is hereby corrected as shown below:

TITLE PAGE

Item (56), U.S. PATENT DOCUMENTS, page 2, left column, line 7, after the word "Proctor, Jr", insert --et al.--.

Item (56), OTHER PUBLICATIONS, page 2, right column, line 1, after the word "System", delete "(UTMS)", and insert therefor --(UMTS)--.

Item (56), OTHER PUBLICATIONS, page 2, right column, line 12, after the words "Algorithms on", delete "UTMS", and insert therefor --UMTS--.

Item (56), OTHER PUBLICATIONS, page 2, right column, line 16, after the words "Sharing for", delete "UTMS", and insert therefor --UMTS--.

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,408,902 B2 | Page 1 of 1 |
| APPLICATION NO. | : 10/775629 | |
| DATED | : August 5, 2008 | |
| INVENTOR(S) | : Zeira et al. | |

It is certified that error appears in the above-identified patent and that said Letters Patent is hereby corrected as shown below:

IN THE SPECIFICATION

At column 1, line 59, before the word "cease", delete "RL quality has deteriorated" and insert therefor --deteriorated RL quality has--.

At column 2, line 33, before the word "wherein", delete "drawing" and insert therefor --drawings--.

At column 3, line 31, before the words "as low", insert --to--.

At column 4, lines 4 & 5, after the word "indicating", delete "event indicating".

At column 4, line 64, before the words "to reduce", delete "used-" and insert therefor --used--.

IN THE CLAIMS

At claim 2, column 5, line 27, before the words "the new", insert --if--.

Signed and Sealed this

Seventh Day of July, 2009

JOHN DOLL
*Acting Director of the United States Patent and Trademark Office*